UNITED STATES PATENT OFFICE.

CHARLES ROHNING, OF LINCOLN, MISSOURI.

MEDICINE FOR HOG-CHOLERA.

SPECIFICATION forming part of Letters Patent No. 327,412, dated September 29, 1885.

Application filed November 8, 1884. (No specimens.)

*To all whom it may concern:*

Be it known that I, CHARLES ROHNING, a citizen of Prussia, residing at Lincoln, in the county of Benton and State of Missouri, have invented certain new and useful Improvements in Composition for the Treatment of Hog-Cholera, of which the following is a specification, reference being had therein to the accompanying drawings.

This invention relates to a novel composition intended for the treatment of hog-cholera, and which, after careful experiment, I have found to be very efficient.

The materials which I employ as ingredients in the compound consist of alum, oxalic acid, and Prussian blue. The proportions which I prefer, under ordinary circumstances, are as follows, namely: Of alum, one pound; oxalic acid, one-half of an ounce, and one-half of an ounce of Prussian blue. These proportions can be followed to advantage in preparing any amount, large or small, of the compound, one table-spoonful to be administered morning and night. In severe attacks, however, the dose may be increased to three or four table-spoonfuls per day.

I am aware that heretofore use has been made of Prussian blue and oxalic acid together in the manufacture of blue inks and with acids or acid salts, and I do not claim such compositions as my invention.

What I claim is—

The herein-described composition of matter for the treatment of hog-cholera, consisting of alum, oxalic acid, and Prussian blue, the proportional amount of each of which relatively to the others is substantially that set forth.

In testimony whereof I affix my signature in presence of two witnesses.

CHARLES ROHNING.

Witnesses:
THOMAS RUSSELL,
H. F. BUEHLER.